(12) United States Patent
Tatsuta

(10) Patent No.: US 10,732,418 B2
(45) Date of Patent: Aug. 4, 2020

(54) WEARABLE DEVICE

(71) Applicant: OLYMPUS CORPORATION, Tokyo (JP)

(72) Inventor: Seiji Tatsuta, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/210,093

(22) Filed: Dec. 5, 2018

(65) Prior Publication Data

US 2019/0113759 A1   Apr. 18, 2019

Related U.S. Application Data

(63) Continuation of application No. PCT/JP2016/068642, filed on Jun. 23, 2016.

(51) Int. Cl.
*G02B 27/01* (2006.01)
*G02B 27/02* (2006.01)
*A41D 20/00* (2006.01)

(52) U.S. Cl.
CPC ......... *G02B 27/0176* (2013.01); *A41D 20/00* (2013.01); *G02B 27/02* (2013.01); *G02B 2027/0178* (2013.01)

(58) Field of Classification Search
None
See application file for complete search history.

(56) References Cited

U.S. PATENT DOCUMENTS

| 6,680,802 | B1 | 1/2004 | Ichikawa et al. |
| 2007/0058261 | A1 | 3/2007 | Sugihara |
| 2017/0090202 | A1 | 3/2017 | Tatsuta |
| 2017/0184861 | A1* | 6/2017 | Lammers-Meis ...... F16M 13/04 |

(Continued)

FOREIGN PATENT DOCUMENTS

| JP | 2001-107943 A | 4/2001 |
| JP | 2001-108935 A | 4/2001 |

(Continued)

OTHER PUBLICATIONS

International Search Report dated Sep. 20, 2016 issued in PCT/JP2016/069510.

(Continued)

*Primary Examiner* — Kenneth B Lee, Jr.
(74) *Attorney, Agent, or Firm* — Scully, Scott, Murphy & Presser, P.C.

(57) ABSTRACT

A wearable device includes a first contact element, a second contact element, a headband that couples the first contact element and the second contact element to each other and presses the first contact element and the second contact element toward temporal regions, a first coupling element that couples the first contact element and the headband to each other, and a second coupling element that couples the second contact element and the headband to each other. Each of the first contact element and the second contact element includes an elastic member having a longitudinal direction extending along a forward and backward direction of the head in a state where the wearable device is worn on the head of the wearer. The elastic member is curved to conform to the curved shape of the temporal regions in the forward and backward direction.

13 Claims, 15 Drawing Sheets

(56) References Cited

U.S. PATENT DOCUMENTS

2019/0113760 A1    4/2019  Tatsuta
2019/0179409 A1*   6/2019  Jones ................. G02B 27/0176

FOREIGN PATENT DOCUMENTS

| JP | 2004-080679 A |   | 3/2004  |
|----|---------------|---|---------|
| JP | 2005-043701 A |   | 2/2005  |
| JP | 2005-252591 A |   | 9/2005  |
| JP | 2005252591 A  | * | 9/2005  |
| JP | 2006-003879 A |   | 1/2006  |
| JP | 2010-226680 A |   | 10/2010 |
| JP | 2012-105117 A |   | 5/2012  |
| JP | 2012-105118 A |   | 5/2012  |
| JP | 2012105118 A  | * | 5/2012  |
| JP | 2014-007513 A |   | 1/2014  |
| JP | 2014007513 A  | * | 1/2014  |
| JP | 2017-068045 A |   | 4/2017  |

OTHER PUBLICATIONS

International Search Report dated Sep. 13, 2016 issued in PCT/JP2016/068642.

* cited by examiner

WEARABLE DEVICE

CROSS REFERENCE TO RELATED APPLICATION

This application is a continuation of International Patent Application No. PCT/JP2016/068642, having an international filing date of Jun. 23, 2016, which designated the United States, the entirety of which is incorporated herein by reference.

BACKGROUND

A wearable device (head-mounted display) that is worn on the head of the user and projects an image within the field of view of the user has been known. For example, JP-A-2005-43701 and JP-A-2006-3879 disclose technology that relates to such a wearable device.

JP-A-2005-43701 discloses a head-mounted display in which three independent contact elements (to be in contact with the head) are disposed to an end portion of a headband, the three contact elements are provided to a base member to form a triangular shape within a contact surface, and the base member and the headband are coupled to each other to have a degree of freedom including rotation around two axes.

JP-A-2006-3879 discloses a pupil-division see-through-type head-mounted display. The technology disclosed in JP-A-2006-3879 significantly reduces the size of an eyepiece element (eyepiece window) that projects (emits) a virtual image of a display image to implement see-through display (i.e., display in which the external field of view and the display image overlap each other), and see-around display (i.e., display in which a wide external field of view is provided).

SUMMARY

According to one aspect of the invention, there is provided a wearable device comprising:

a first contact element that comes into contact with one of temporal regions of a wearer;

a second contact element that comes into contact with another of the temporal regions;

a headband that couples the first contact element and the second contact element to each other and presses the first contact element and the second contact element toward the temporal regions;

a first coupling element that couples the first contact element and the headband to each other; and a second coupling element that couples the second contact element and the headband to each other, wherein each of the first contact element and the second contact element includes an elastic member having a longitudinal direction extending along a forward and backward direction of the head in a state where the wearable device is worn on the head of the wearer, the elastic member being curved to conform to a curved shape of the temporal regions in the forward and backward direction, the first coupling element is a first rotation mechanism that enables the headband to rotate freely on a first axis, a second axis, and a third axis, the second coupling element is a second rotation mechanism that enables the headband to rotate freely on a fourth axis, a fifth axis, and a sixth axis, the first axis and the fourth axis are each a rotation axis extending along a direction between the first coupling element and the second coupling element, the second axis is a rotation axis extending along the longitudinal direction of the first contact element, the third axis is a rotation axis extending along a short-side direction of the first contact element, the fifth axis is a rotation axis extending along the longitudinal direction of the second contact element, and the sixth axis is a rotation axis extending along a short-side direction of the second contact element.

DESCRIPTION OF EXEMPLARY EMBODIMENTS

Figure 1:
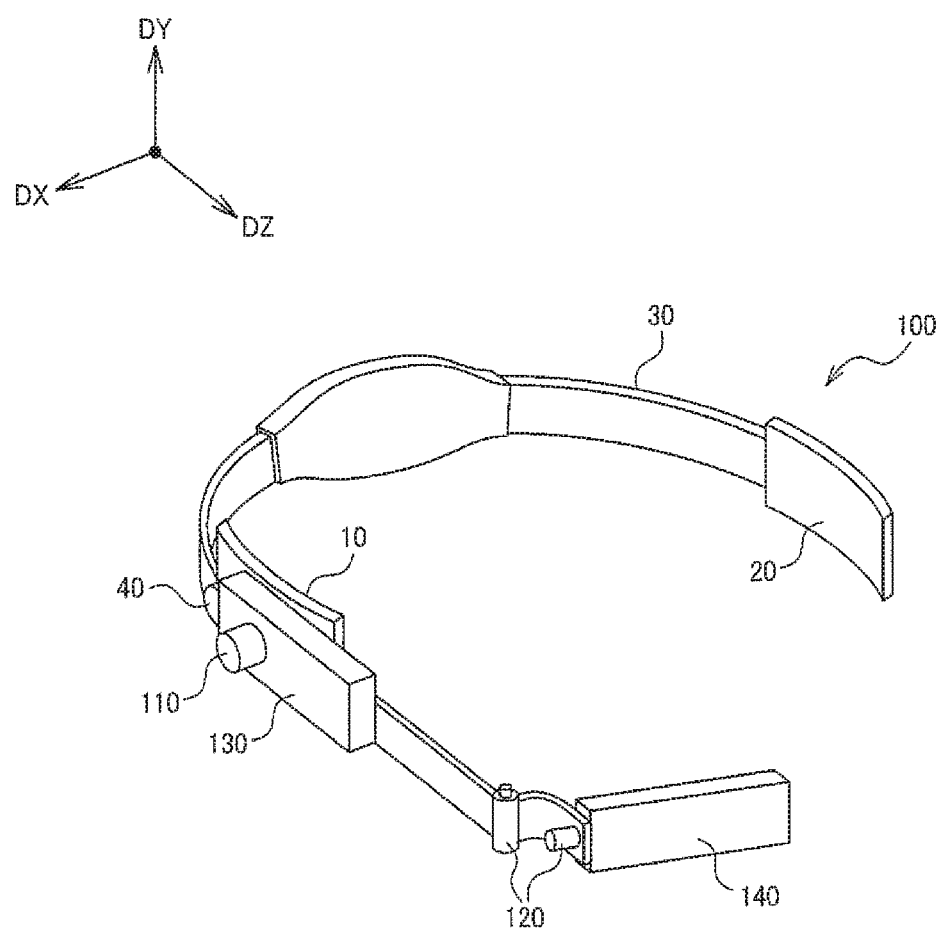
FIG. 1 is a perspective view illustrating a configuration example of a wearable device.

The wearable device described above needs to be stably held on the head. For example, if the device is a display, the display needs to be stably held to be in front of an eye of the user so that its display screen can be maintained to be appropriately visually recognizable by the user. For example, a small head-mounted display (for example, JP-A-2006-3879 described above) having a display with a relatively small eye-box (a tolerable range of deviation between the line of sight and the optical axis) requires to be held with high stability.

On the other hand, the display is also required to swiftly compensate for a difference among individual users in wearing conditions. For example, the wearable device is desirably wearable stably without being affected by a difference among individual users in the shape of the head or hairstyle, or whether or not the user is wearing a worn object (such as an eyewear, a hearing aid, or a hat, for example) other than the wearable device. For example, the mechanism for stably holding the head-mounted display disclosed in JP-A-2005-43701 described above involves a large portion to be in contact with the head, because the three contact elements are provided to the base member to form a triangular shape within the contact surface. Thus, the device is likely to be plagued by disadvantages such as interfering with the worn object. A holding mechanism may be also employed for headphones and the like. Unfortunately, such a configuration has an earmuff portion serving as the contact element and covering the ear, and thus is also likely to be plagued by disadvantages such as the earmuff portion interfering with the worn object.

One aspect of the present embodiment relates to a wearable device including a first contact element that comes into contact with one of temporal regions of a wearer, a second contact element that comes into contact with another of the temporal regions, a headband that couples the first contact element and the second contact element to each other and presses the first contact element and the second contact element toward the temporal regions, a first coupling element that couples the first contact element and the headband to each other, and a second coupling element that couples the second contact element and the headband to each other. Each of the first contact element and the second contact element includes an elastic member having a longitudinal direction extending along a forward and backward direction of the head in a state where the wearable device is worn on the head of the wearer. The elastic member is curved to conform to a curved shape of the temporal regions in the forward and backward direction.

In one aspect of the present embodiment, the first contact element and the second contact element have a shape having a longitudinal direction extending along the forward and backward direction of the head. This configuration is less affected by a difference among individual users (such as a difference in the shape of the head or hairstyle, or whether or not the user is wearing a worn object other than the wearable device). In one aspect of the present invention, the first contact element and the second contact element are elastic members that are curved to conform to the curved shape of the temporal regions in the forward and backward direction. The curved and elastic first contact element and second contact element are pressed by the headband toward the temporal regions, so that the first contact element and the second contact element can be in stable contact with the temporal region. With this configuration, the device can be stably held regardless of the difference among individual users in wearing conditions.

Exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

Figure 2:
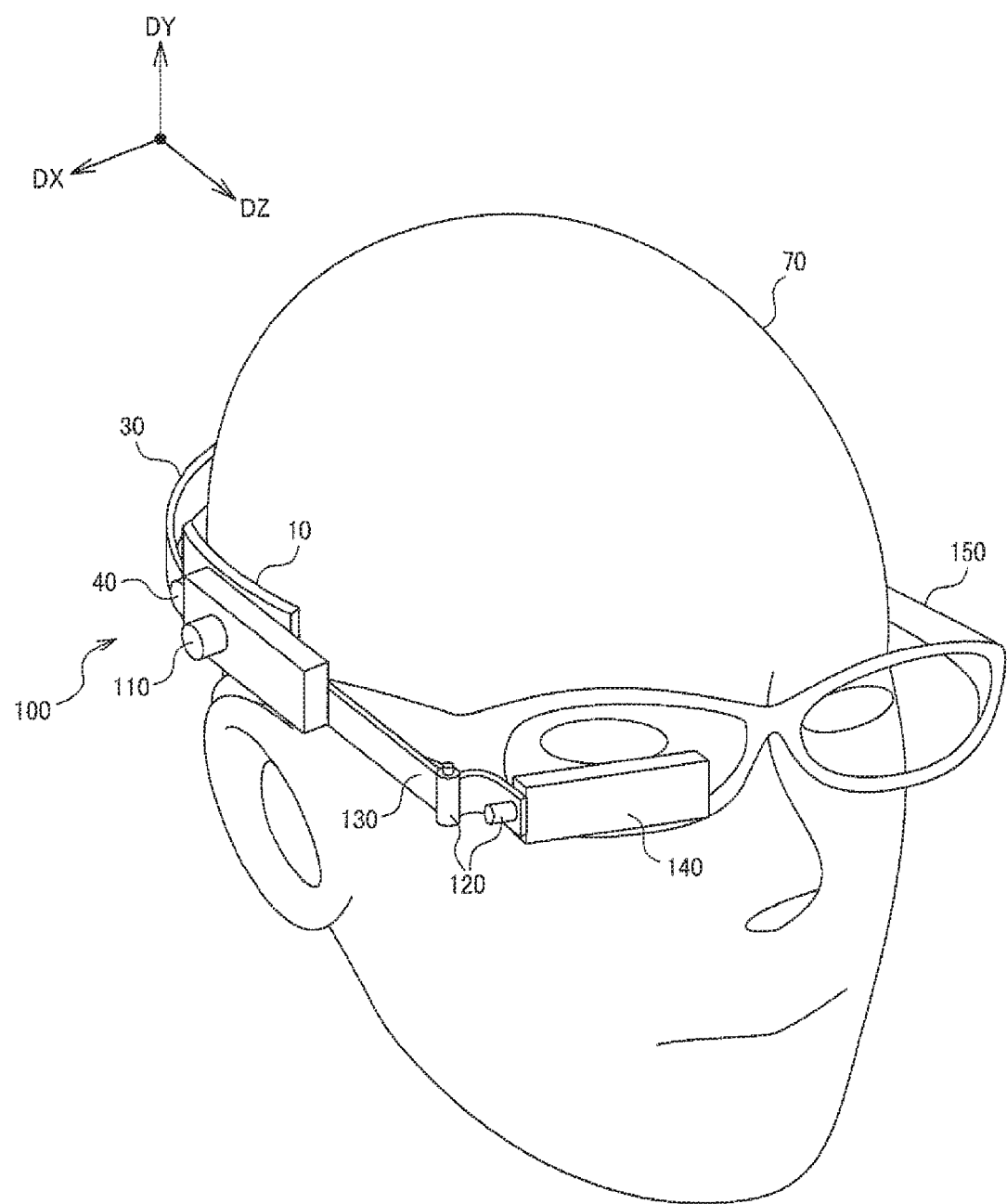
FIG. 2 is a perspective view illustrating a configuration example of the wearable device worn on a head of a user.
Figure 3:
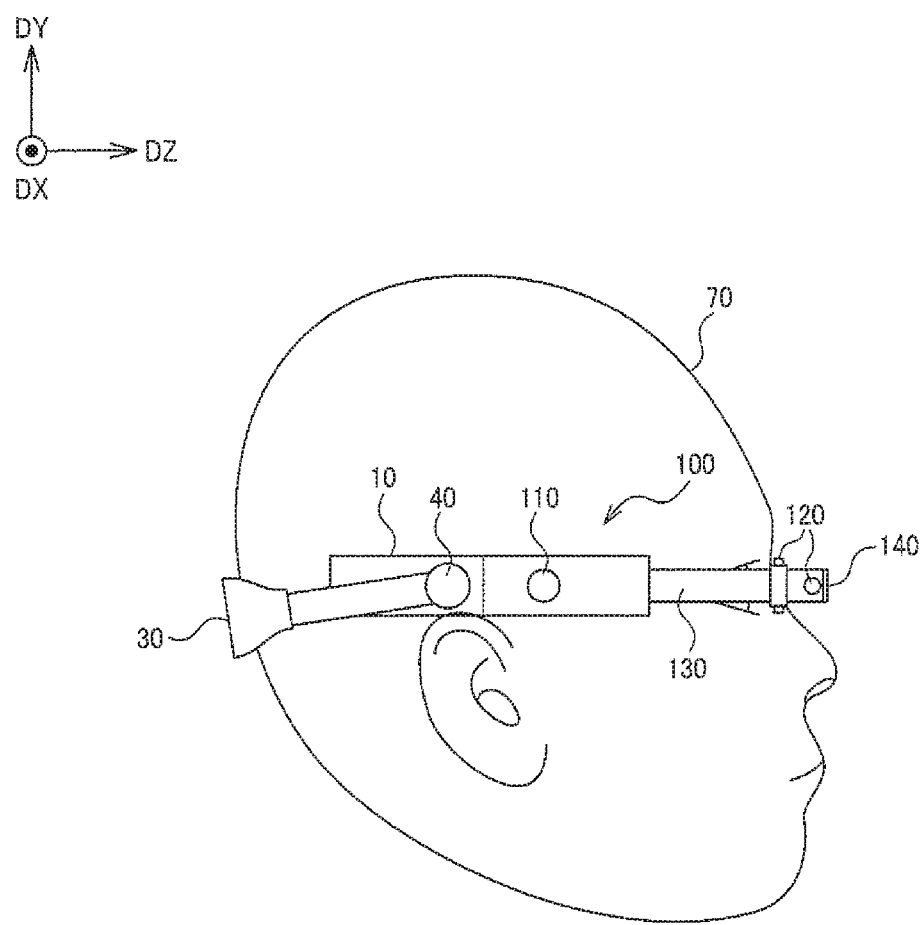
FIG. 3 is a side view illustrating a configuration example of the wearable device worn on the head of the user.
Figure 4:
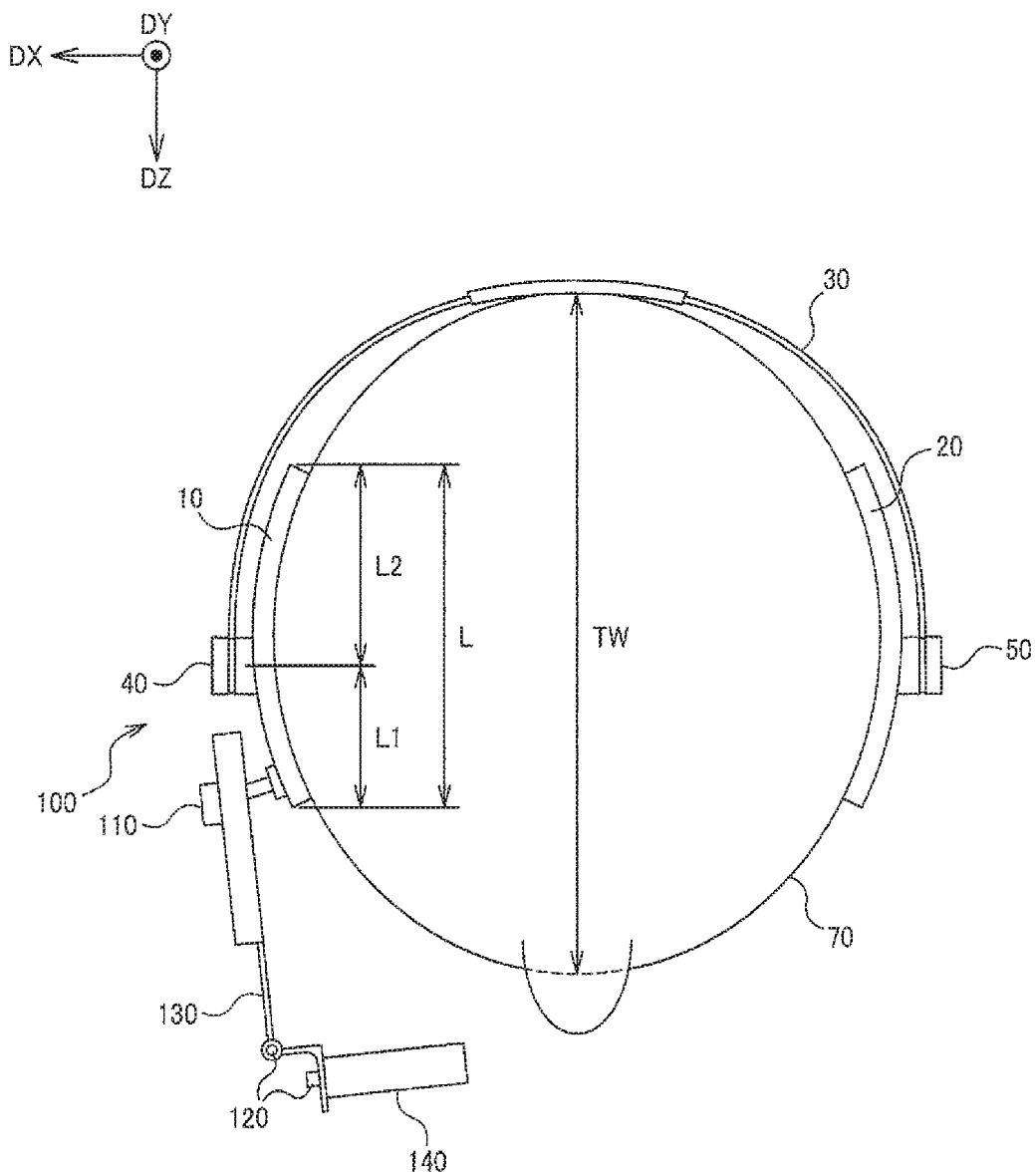
FIG. 4 is a top view illustrating a configuration example of the wearable device worn on the head of the user.

FIG. 1 to FIG. 4 illustrate a configuration example of a wearable device 100 according to the present embodiment. FIG. 1 is a perspective view illustrating the wearable device 100. FIG. 2 is a perspective view illustrating the wearable device 100 worn on a head 70 of a user. FIG. 3 is a side view illustrating the wearable device 100 worn on the head 70 of the user. FIG. 4 is a top view illustrating the wearable device 100 worn on the head 70 of the user.

In FIG. 1 to FIG. 4, directions DX, DY, and DZ are directions that are orthogonal to each other (intersect each other in a broader sense). The direction DX is a rightward direction (a direction from the center of the head 70 toward the right side of the head) as viewed from the user, the direction DY is an upward direction (a direction from the center of the head 70 toward the top of the head) as viewed from the user, and the direction DZ is a forward direction (a direction from the center of the head 70 toward the forward side of the face) as viewed from the user.

The wearable device 100 includes a first contact element 10 (first contacting element), a second contact element 20 (second contacting element), a headband 30, a first coupling element 40, and a second coupling element 50. The wearable device 100 may further include an arm 130, a display 140 (display device), a coupling element 110, and a rotation mechanism 120.

The first contact element 10 is a member (part) that comes into contact with one of the temporal regions of the user (wearer). The second contact element 20 is a member that comes into contact with the other of the temporal regions of the user. Thus, each of the contact elements 10 and 20 comes into contact with a temporal region of the user wearing the wearable device 100. The term "comes into contact" as used herein means that one object abuts and stays in contact with another object. For example, in FIG. 2 to FIG. 4, the first contact element 10 comes into contact with the right temporal region as viewed from the user and the second contact element 20 comes into contact with the left temporal region as viewed from the user.

Each of the contact elements 10 and 20 is an elastic member that has a longitudinal direction in a forward and backward direction of the head 70 of the user on which the wearable device 100 is mounted and is curved to conform to the curved shape of the temporal regions in the forward and backward direction. In FIG. 1 to FIG. 4, the forward and backward direction of the head 70 corresponds to the direction DZ (and −DZ). The curved shape of the temporal regions along the forward and backward direction is a curved shape of a portion of the temporal regions in contact with the contact elements 10 and 20, and represents the shape of the temporal regions on the outer circumference of the head 70 as viewed from the top as illustrated in FIG. 4, for example. The contact elements 10 and 20 may each be curved in any manner as long as the recessed side faces the head 70, and may have an arc shape (including substantially arc shape) centered on a portion on the side of the head 70. The curved shape does not necessarily completely conform to the curved shape of the temporal regions, and may be determined while taking account of an individual difference of the shape of the head and the like.

The contact elements 10 and 20 each have an elongated shape along the forward and backward direction of the head 70 as viewed in the lateral direction (DX) of the head 70. Specifically, the elongated shape has a length in the forward and backward direction (DZ) of the head 70 longer than a length (width) in the upward-downward direction (DY). For example, the contact elements 10 and 20 each have a rectangular shape, an elliptical shape, or any other like shape. For example, a rectangular-like shape includes a rectangular shape with rounded corners. For example, the length in the upward-downward direction (short-side direction) is ⅒ to ⅓ of the length in the forward and backward direction (longitudinal direction).

The headband 30 couples the first contact element 10 and the second contact element 20 to each other, and presses the first contact element 10 and the second contact element 20 toward the temporal regions. The term "press" as used herein means application of force in a certain direction.

Thus, the headband 30 is configured to apply force for pressing the contact elements 10 and 20 against the temporal regions of the user wearing the wearable device 100, via the coupling elements 40 and 50.

More specifically, the headband 30 is a band-shaped (belt-shaped) elastic member. The headband 30 is configured in such a manner that the distance between the contact elements 10 and 20 (the width of the head 70 in the left and right direction) can be shorter in a natural state where the wearable device 100 is not worn by the user and thus no force is applied to the headband 30 than in a state where the wearable device 100 is worn by the user. Once the wearable device 100 is worn on the head 70 by pressing the contact elements 10 and 20 away from each other, the contact elements 10 and 20 are pressed against the temporal regions due to the elasticity of the headband 30. The headband 30 may be provided with a slide mechanism and the like for adjusting the length of the headband 30.

The first coupling element 40 couples the first contact element 10 and the headband 30 to each other. The second coupling element 50 couples the second contact element 20 and the headband 30 to each other. The coupling elements 40 and 50 include rotation mechanisms that connect the contact elements 10 and 20 and the headband 30 to each other so as to be rotatable at least around a single axis. This single axis is in parallel with the left and right direction (DX) of the head 70. Specifically, as illustrated in FIG. 3, the headband 30 can rotate clockwise or counterclockwise as viewed in the lateral direction of the head 70. The coupling elements 40 and 50 are not limited to the rotation around this single axis, and may have a further degree of rotation freedom.

The arm 130 is coupled (connected) to the first contact element 10 via the coupling element 110, and holds the display 140 at a position desired by the user (for example, in front of an eye of the user). For example, the arm 130 has one end coupled (connected) to the display 140 via the rotation mechanism 120 and has the other end connected to the coupling element 110 of the first contact element 10 via the coupling element 110. The coupling element 110 does not necessarily need to be provided to the end of the arm 130, and may be provided away from the end of the arm 130. A slide mechanism and the like for adjusting the length of the arm 130 may further be provided.

The coupling element 110 and a device mounting part 11 of the first contact element 10 serve as a mechanism for holding the arm 130 to be rotatable relative to the first contact element 10. For example, the mechanism (for example, a ball joint) enables free rotation around three axes. However, this should not be construed in a limiting sense, and the coupling element 110 and the device mounting part 11 may serve as any mechanism enabling the display 140 to be adjusted to be at a position desired by the user.

The rotation mechanism 120 holds the display 140 in such a manner as to be rotatable relative to the arm 130, and enables rotation around an axis in parallel to a horizontal scan direction of a display image, for example. Alternatively, rotation around an axis orthogonal to (intersecting in a broader sense) the axis may be enabled. For example, rotation around an axis in parallel with the direction DY may be enabled, in a state where the display 140 is adjusted to be in front of an eye of the user with the axis in parallel with the horizontal scan direction of the display image set to be in parallel with the direction DX. Alternatively, rotation around an axis in parallel with the direction DZ may be enabled. Alternatively, free rotation around these three axes may be enabled.

The display 140 is configured to guide light (image) output from a display device to the eyepiece window through an optical system, and emit the guided light from the eyepiece window toward the pupil of the eyeball (i.e., emit the guided light in the direction along the line of sight of the eyeball (visual axis direction)) to display an enlarged virtual image of the image within the field of view (i.e., project the image onto the retina). The optical system includes a prism, a mirror, a lens, and the like, for example.

For example, the display 140 may utilize a pupil-division see-through optical system. The pupil-division see-through optical system is designed so that the exit pupil of the optical system is set at a point around the eyepiece lens (eyepiece window). With this configuration, the eyepiece lens can be downsized. With the eyepiece lens downsized, light can enter the pupil of the eye from the external field of view through the outside of the eyepiece lens to implement see-through display. When using the pupil-division see-through optical system, the width of the end part (in which the eyepiece window is provided) of the display 140 is 4 mm or less, for example. Note that as the display 140, a display that utilizes various optical systems other than the pupil-division see-through optical system may be employed.

In the example, described above, the device held by the wearable device 100 is the display 140. However, this should not be construed in a limiting sense. For example, the device held by the wearable device 100 may be a camera and the like.

With the embodiment described above, the contact elements 10 and 20 each have a shape with a longitudinal direction extending along the forward and backward direction (DZ) of the head 70 so that a wide range of individual differences among users in wearing conditions can be compensated. The contact elements 10 and 20, which come into contact with the head 70, thus having a small width in the upward-downward direction and being elongated in the forward and backward direction are less affected by an individual difference among users (such as a difference in the shape of the head or hairstyle, or whether or not the user is wearing a worn object other than the wearable device). For example, as illustrated in FIG. 2, the user may be wearing an eyewear. Also in such a case, the contact elements 10 and 20 having the longitudinal direction in parallel with the temple of the eyewear can be brought into contact with the temporal regions without interfering with the temple. Similarly, the contact elements 10 and 20 can be brought into contact with the temporal regions of a user wearing a behind-the-ear hearing aid and the like, without interfering with the hearing aid.

The contact elements 10 and 20 according to the present embodiment are each an elastic member curved along the curved shape of the temporal regions in the forward and backward direction (DZ). With this configuration, the wearable device 100 can stably hold a device with a wide range of individual differences among users in wearing conditions compensated. The contact elements 10 and 20 each have a curved shape so as to have a large portion in contact with the temporal regions. The contact elements 10 and 20 are pressed by the headband 30 so as to be in closer contact with the temporal regions due to the elasticity of the contact elements 10 and 20. In this manner, the contact elements 10 and 20 are in stable contact with the temporal regions, and the device can be stably held. The contact elements 10 and 20 that are elastic members can deform in accordance with the shape of a head, which may vary among individual users. Thus, the contact elements 10 and 20 can be in stable contact with the temporal regions.

2. Detailed Configuration

A detailed configuration example of each section of the wearable device 100 is described below.

As illustrated in FIG. 4, the contact elements 10 and 20 each have a length L in the longitudinal direction that is equal to or longer than ¼ and equal to or shorter than ½ of a width TW of the head 70 in the forward and backward direction (DZ).

The width TW is a width of a portion of the outer circumference of the head 70 that comes into contact with the contact elements 10 and 20 as viewed from the upward direction (DY) side. For example, a statistically (ergonomically) logical width in the forward and backward direction (DZ) of the head 70 may be applied to the width TW, which may actually vary among individuals. Although only the length L of the first contact element 10 in the longitudinal direction is illustrated in FIG. 4, the second contact element 20 also has the length L in the longitudinal direction.

The contact elements 10 and 20 that are too short in the forward and backward direction of the head 70 are difficult to stably hold the wearable device 100 on the head 70. On the other hand, the contact elements 10 and 20 that are too long in the forward and backward direction of the head 70 have a higher risk of having forward ends coming into contact with a periphery of the eyes of the user to be annoying to the user, or of interfering with a worn object other than the wearable device 100, hairstyle, and the like. In view of this, the contact elements 10 and 20 according to the present embodiment have a length in the forward and backward direction of the head 70 in an appropriate range, and thus can stably hold the device while being less likely to be annoying to the user or interfering with the worn object other than the wearable device 100, hairstyle, and the like.

In the present embodiment, the first coupling element 40 is disposed more on the forward side of the head 70 than the center of the first contact element 10 in the longitudinal direction as illustrated in FIG. 4. The second coupling element 50 is disposed more on the forward side of the head 70 than the center of the second contact element 20 in the longitudinal direction.

Relationship L1<L2 holds true for the head 70 as viewed from the side of the upward direction (DY), where L1 represents a distance between the first coupling element 40 and the forward end of the first contact element 10 and L2 represents a distance between the first coupling element 40 and the backward end of the first contact element 10. For example, the distance L1 is equal to or longer than ¼ and equal to or shorter than ½ of the length L of the first contact element 10. Preferably, L1/L=⅓ holds true. For example, the first coupling element 40 is positioned at an intersection between the first contact element 10 and the rotation axis (the axis in parallel with the left and right direction (DX) of the head 70) of the headband 30 as described above. The description given on the first coupling element 40 as an example similarly applies to the second coupling element 50.

With the coupling elements 40 and 50 provided further on the forward side than the centers of the contact elements 10 and 20 as described above, the distance L1 between the coupling elements 40 and 50 and the forward ends of the contact elements 10 and 20 can be shortened without compromising the length L of the contact elements 10 and 20. Thus, the contact elements 10 and 20 can have a lower risk of having the forward ends coming into contact with the periphery of the eyes of the user (such as a temple), and can have the length L to be capable of stably holding the device.

In the present embodiment, the contact elements 10 and 20 receiving no force (force for pressing the elements against the temporal regions, for example) to be in the natural state each have a curved shape with a larger curvature than the curved shape of the temporal regions.

The curvature as used herein represents a curved amount of a curved line or a curved surface, and corresponds to a reciprocal of the radius of the curved line or the curved surface. Thus, the curvature as used in the present embodiment corresponds to a reciprocal of a radius of an arc approximating the curved shape of the temporal regions and the curved shape of the contact elements 10 and 20. The curvature of the curved shape of the temporal regions actually varies among individuals. Thus, the curvature of the contact elements 10 and 20 is set to be larger than the curvature of the curved shape of the temporal regions of majority of persons statistically (ergonomically) determined.

With this configuration, the curved contact elements 10 and 20 pressed against the temporal regions with the headband 30 open (have the curvature of the curved shape reduced) due to the elasticity of the contact elements 10 and 20 to have shapes conforming to the curved shape of the temporal regions. Thus, the contact elements 10 and 20 can be in closer contact with the temporal regions, whereby the device can be more stably held.

In the present embodiment, as illustrated in FIG. 3, the coupling elements 40 and 50 are disposed above (DY) the ears of the user in a state where the wearable device 100 is worn on the head 70 of the user.

The expression "above the ear" indicates a portion further in the upward direction (DY) than an auricle (a portion of the ear providing an outer appearance) of the head 70 as viewed in the lateral direction (DX). With this configuration, the coupling elements 40 and 50 can be positioned in the forward and backward direction (DZ) of the head 70, to be within a range of the width of the auricle in the forward and backward direction.

At a portion above the ear, a tangential line of the curved shape of the temporal region is in parallel with the forward and backward direction of the head 70. Thus, with the wearable device 100 worn with the coupling elements 40 and 50 disposed above (DY) the ears of the user, the contact elements 10 and 20 are less likely to be displaced and thus can be stably brought into contact with the temporal regions.

Figure 5:
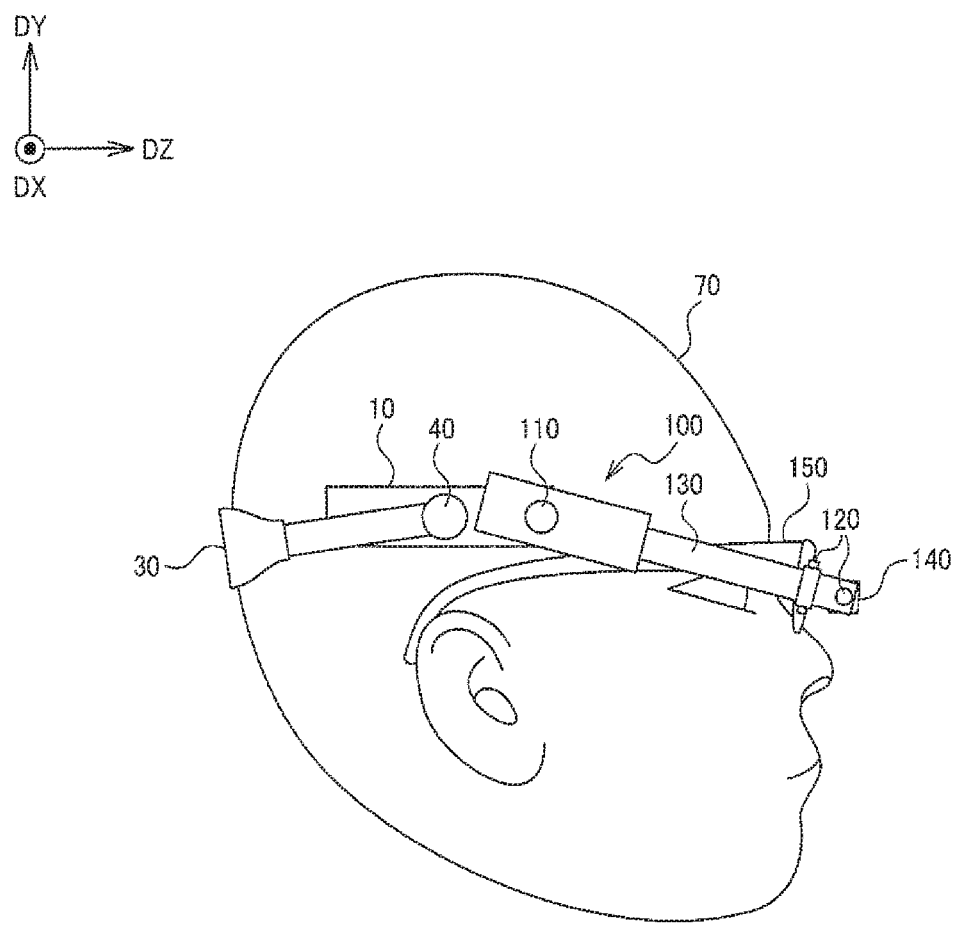
FIG. 5 is a diagram illustrating a state where the user wearing an eyewear wears the wearable device.

As illustrated in FIG. 5, a user wearing an eyewear (or a hearing aid and the like) may wear the wearable device 100 with the coupling elements 40 and 50 provided more on the upward side compared with a case where the user is not wearing the eyewear. Specifically, the contact elements 10 and 20 having an elongated shape along the forward and backward direction of the head 70 can translate along the upward and downward direction with the positions of the coupling elements 40 and 50 adjusted in the upward and downward direction. Thus, the contact elements 10 and 20 can be adjusted to be positioned to be capable of stably coming into contact with the temporal regions without interfering with a worn object such as an eyewear.

FIG. 6 to FIG. 8B are diagrams illustrating rotation axes of the coupling elements 40 and 50. The arm 130 and the display 140 are omitted in FIG. 8A and FIG. 8B for the sake of illustration.

The first coupling element 40 is a first rotation mechanism that enables the headband 30 to rotate with a degree of freedom including rotation around a first axis to a third axis (rotatable connection between the contact element 10 and an end of the headband 30). The second coupling element 50 is a second rotation mechanism that enables the headband 30 to rotate with a degree of freedom including rotation around a fourth axis to a sixth axis (rotatable connection between the contact element 20 and an end of the headband 30). Here, the expression "rotatable with a degree of freedom including rotation around the first axis to the third axis" includes a case where the rotation around the first axis, the rotation around the second axis, and the rotation around the third axis are enabled, and a case where rotation around any axis is enabled as in a case where a ball joint and the like is used.

Figure 6:
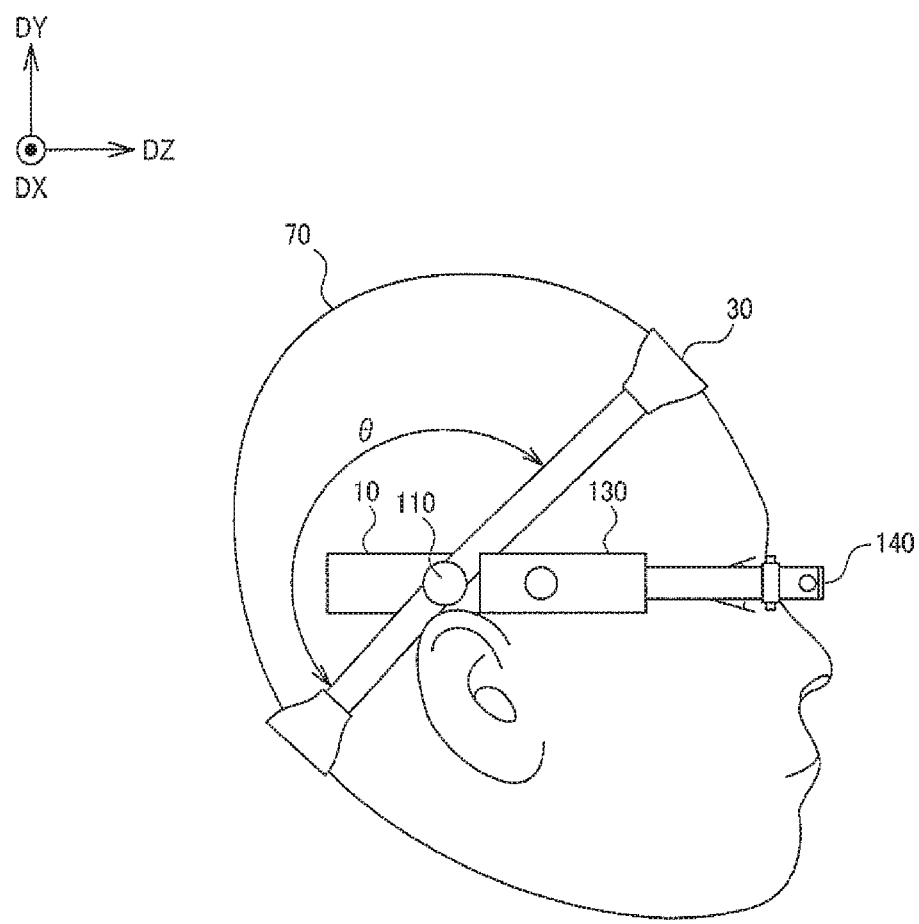
FIG. 6 is a diagram illustrating rotation axes of a first coupling element and a second coupling element.

As illustrated in FIG. 6, the first axis and the fourth axis are each a rotation axis extending along the direction (DX) between the first coupling element 40 and the second coupling element 50. Thus, the first axis and the fourth axis are in parallel (or substantially in parallel) with a direction between the first coupling element 40 and the second coupling element 50.

Figure 7A:
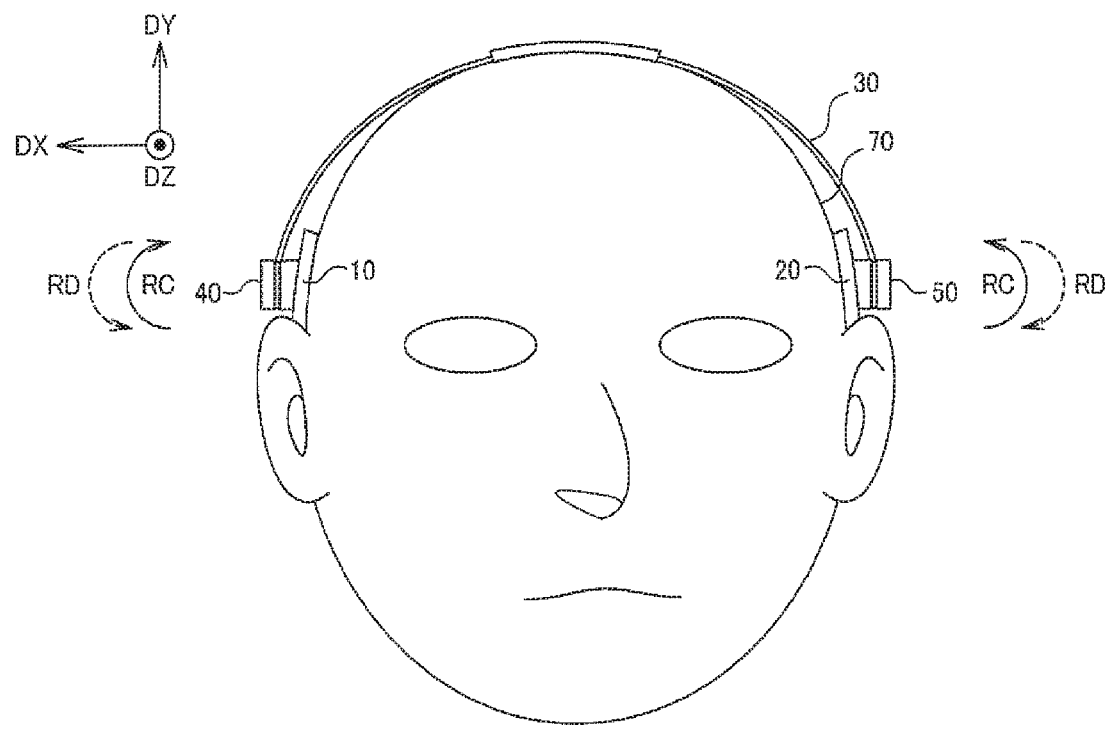
FIG. 7A and FIG. 7B are diagrams illustrating the rotation axes of the first coupling element and the second coupling element.
Figure 7B:
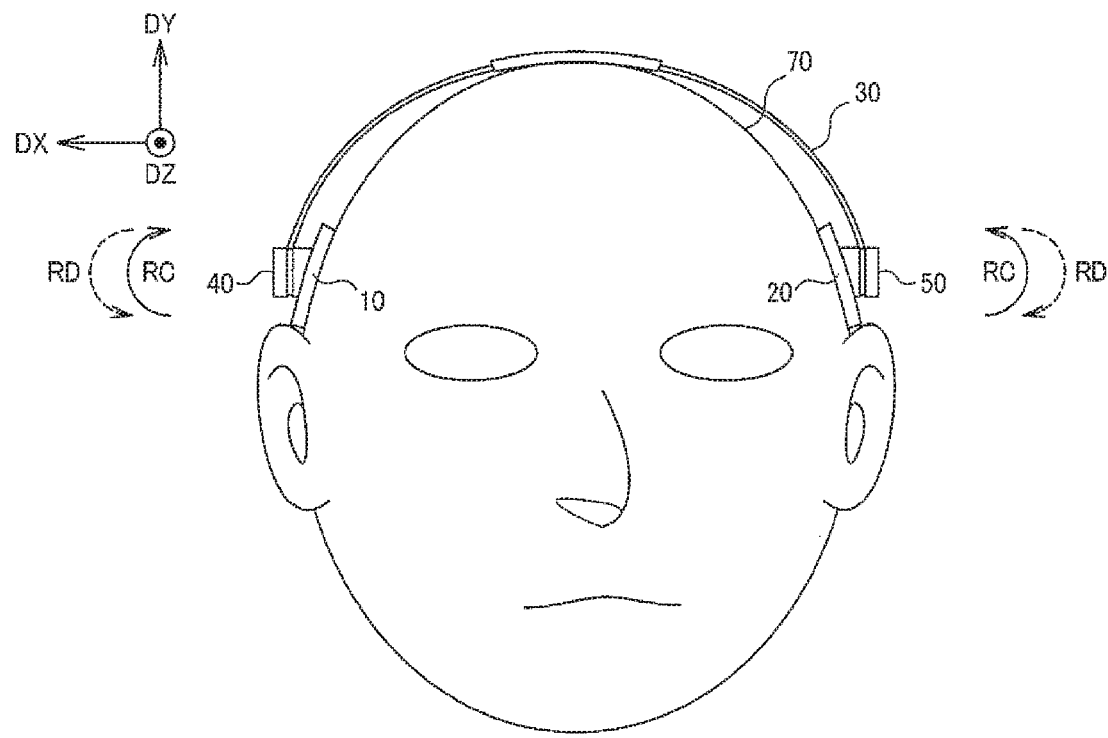

As illustrated in FIG. 7A and FIG. 7B, the second axis is a rotation axis extending along the longitudinal direction (DZ) of the first contact element 10. The fifth axis is a rotation axis extending along the longitudinal direction (DZ) of the second contact element 20. Thus, as illustrated in FIG. 7A, the ends of the headband 30 can rotate in a direction RC or a direction RD around the second axis and the fifth axis, with respect to the contact elements 10 and 20. FIG. 7B illustrates an example where the contact elements 10 and 20 rotate in the direction RC with respect to the headband 30 (that is, an example where the ends of the headband 30 rotate in the direction RD with respect to the contact elements 10 and 20).

Figure 8A:
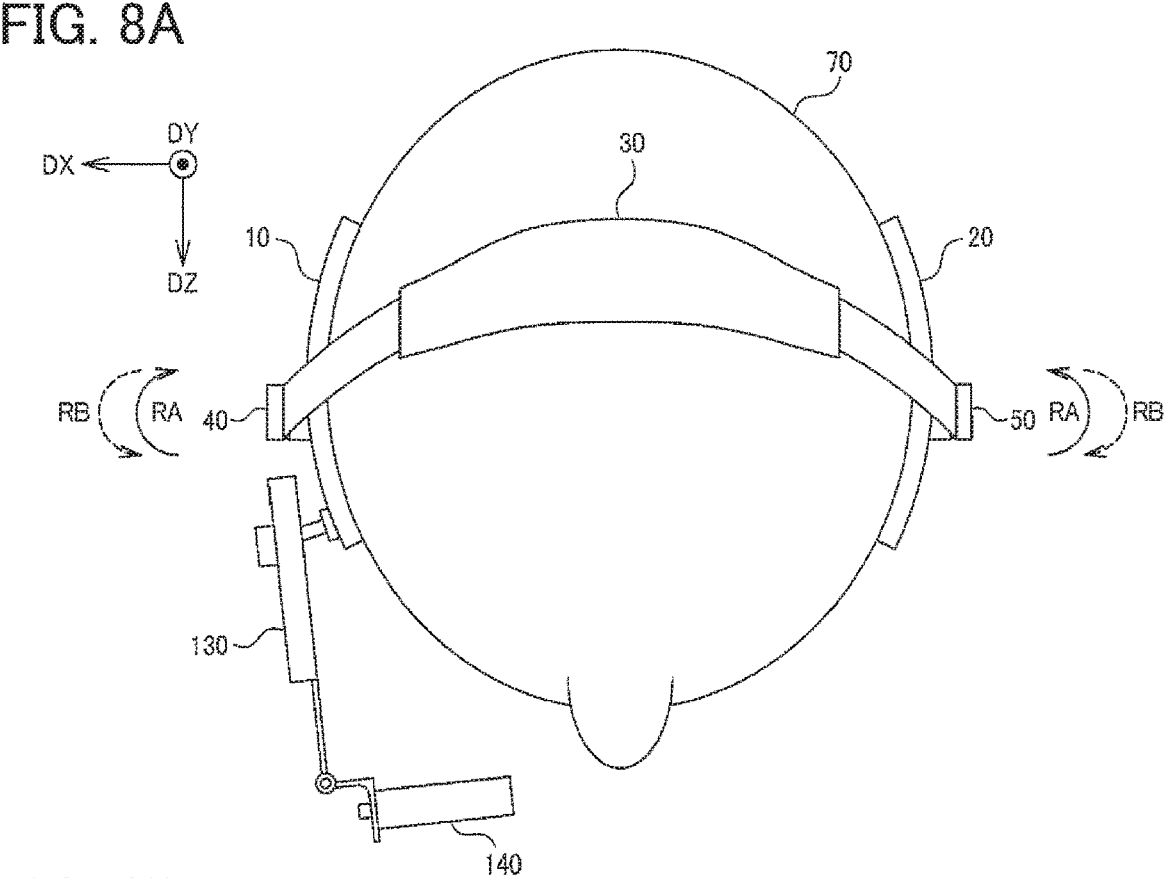
FIG. 8A and FIG. 8B are diagrams illustrating the rotation axes of the first coupling element and the second coupling element.
Figure 8B:
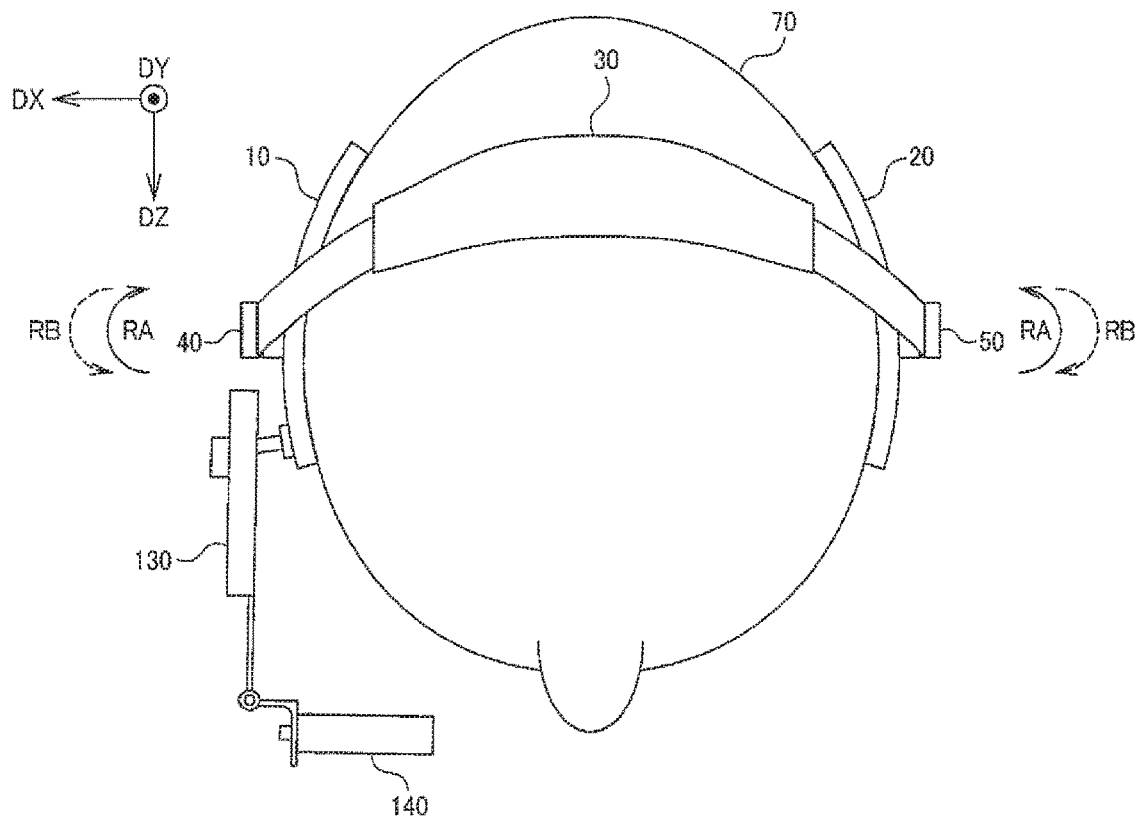

As illustrated in FIG. 8A and FIG. 8B, the third axis is a rotation axis extending along the short-side direction (DY) of the first contact element 10. The sixth axis is a rotation axis extending along the short-side direction (DY) of the second contact element 20. Thus, the ends of the headband 30 are rotatable around the third axis and the sixth axis in the direction RA or the direction RB with respect to the contact elements 10 and 20 as illustrated in FIG. 8A. FIG. 8B illustrates an example where the contact elements 10 and 20 rotate in the direction RA with respect to the headband 30 (that is, an example where the ends of the headband 30 rotate in the direction RB with respect to the contact elements 10 and 20).

With the coupling elements 40 and 50 rotating around the axes as described above, a configuration usable for various shapes of the head, hairstyles, and the like can be achieved. For example, the headband 30 rotating around the first axis and the fourth axis, in parallel with the left and right direction (DX) as described above with reference to FIG. 6, can be adjusted to be freely positioned (for example, at the forehead, the top of the head, the back of the head, and the like). Thus, a configuration usable with various hairstyles and worn objects (such as a hair accessory for example) can be achieved. With the headband 30 rotating around the second axis and the fourth axis in parallel with the forward and backward direction (DZ) and around the third axis and the sixth axis in parallel with the upward-downward direction (DY), as described above with reference to FIG. 7A to FIG. 8B, a configuration usable with various shapes of the head can be achieved. For example, the head 70 may have various shapes including: a shape with a distance between the temporal regions reducing toward the top of the head as illustrated in FIG. 7B; and a shape with a distance between the temporal regions reducing toward the back of the head as illustrated in FIG. 8B. In this context, the rotation between the headband 30 and the contact elements 10 and 20 around the second axis, the third axis, the fifth axis, and the sixth axis enables the contact elements 10 and 20 to be in contact with the temporal regions at various angles.

In the present embodiment, as illustrated in FIG. 6, the headband 30 can rotate around the first axis and the fourth axis within an angle range θ of 120° or more including an angle with which the headband 30 is disposed above the head 70 and an angle with which the headband 30 is disposed on the back of the head 70.

The expression "above the head 70" corresponds to a direction from the center of the head 70 toward the top of the head 70, and thus corresponds to the direction DY in FIG. 6. The expression "back of the head 70" corresponds to a direction from the center of the head 70 toward the back of the head, and corresponds to a direction (−DZ) opposite to the direction DZ in FIG. 6.

With the position of the headband 30 being adjustable within a wide angle range that is 120° or more and includes the top of the head and the back of the head as described above, a configuration usable with various hairstyles and worn objects (such as a hair accessory for example) can be achieved.

In the present embodiment, an angle range within which the headband 30 is rotatable around the second axis and the third axis (a range of rotation in the directions RA, RB, RC, and RD) is smaller than the angle range θ within which the headband 30 is rotatable around the first axis. Similarly, an angle range within which the headband 30 is rotatable around the fifth axis and the sixth axis (a range of rotation in the directions RA, RB, RC, and RD) is smaller than the angle range θ within which the headband 30 is rotatable around the fourth axis.

These angle ranges within which the headband 30 is rotatable around the second axis, the third axis, the fifth axis, and the sixth axis are equal to or smaller than ⅕ of the angle range θ (≥120°) within which the headband 30 is rotatable around the first axis, for example. Preferably the angle range is 5° to 20°.

If the headband 30 is freely rotatable (rotation described above with reference to FIG. 7A to FIG. 8B) within a wide angle including an angle with which the contact elements 10 and 20 are brought into contact with the temporal regions, the contact elements 10 and 20 are freely inclined at any angle relative to the ends of the headband 30 due to their own weight, while the wearable device 100 is not worn. As a result, the contact elements 10 and 20 might fail to be appropriately brought into contact with the temporal regions when the wearable device 100 is worn, and thus might be annoying to the user. In view of this, the angle range described above is set so that the rotation around the second axis, the third axis, the fifth axis, and the sixth axis is somewhat limited while the wearable device 100 is not worn. Thus, the contact elements 10 and 20 can be appropriately brought into contact with the temporal regions when the wearable device 100 is worn.

Figure 9A:
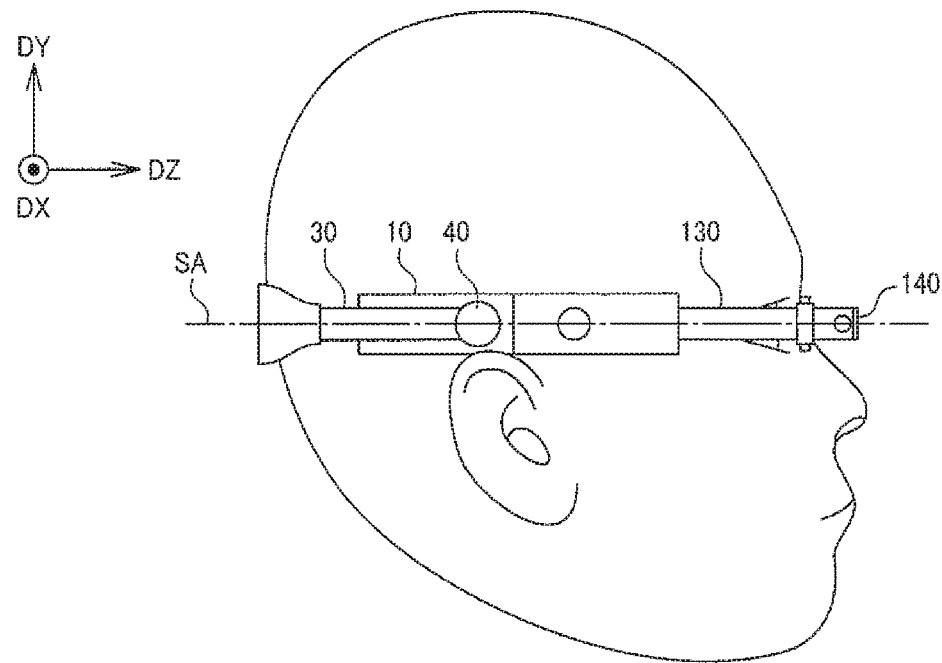
FIG. 9A and FIG. 9B are diagrams illustrating the wearable device reversed left and right.

In the present embodiment, the wearable device 100 is configured to be vertically symmetrical as illustrated in FIG. 9A.

More specifically, the headband 30 may be arranged on the side of the back of the head with the headband 30 and the contact elements 10 and 20 linearly arranged along the forward and backward direction (DZ) of the head 70, as viewed in the left and right direction (DX) of the head 70. In this state, the contact elements 10 and 20 and the headband 30 are line symmetrical (vertically symmetrical) about an axis of symmetry SA along the forward and backward direction (DZ) of the head 70.

More specifically, the coupling elements 40 and 50 each have its center (the intersecting point between the first axis and the fourth axis and the contact elements 10 and 20 described above) arranged on the axis of symmetry SA. Similarly, the arm 130 is vertically symmetrical. Specifically, the display 140 may be disposed on the forward side of the face with the arm 130 and the contact elements 10 and 20 linearly arranged along the forward and backward direction (DZ) of the head 70 as viewed in the left and right direction (DX) of the head 70. In this state, the arm 130 is line symmetrical (vertically symmetrical) about the axis of symmetry SA extending along the forward and backward direction (DZ) of the head 70.

Figure 9B:
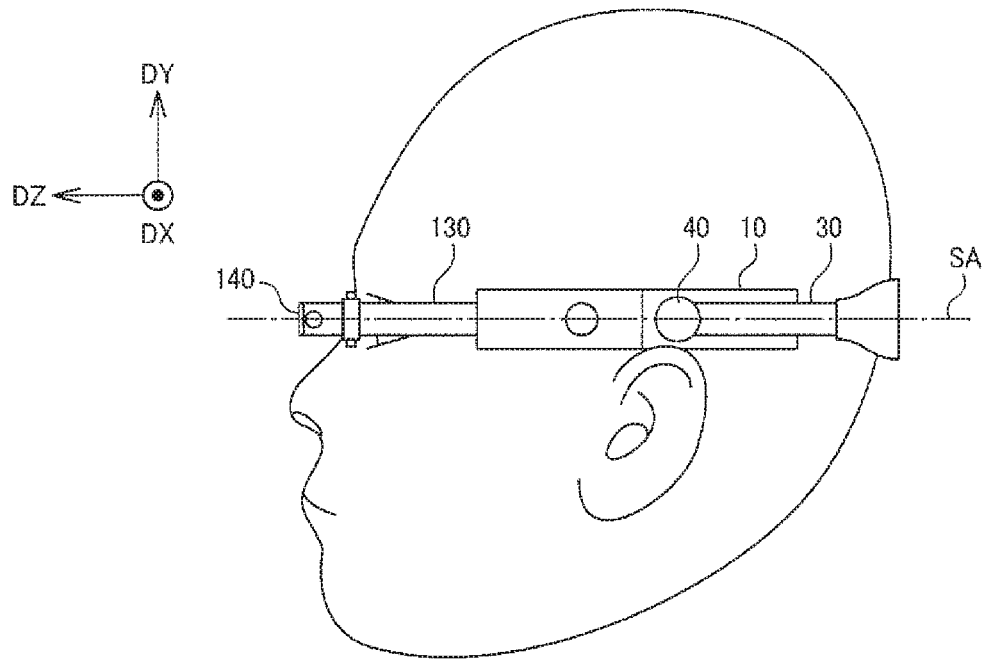

With this configuration, a display image can be displayed to the right eye of the user as illustrated in FIG. 9A, and the wearable device 100 may be reversed left and right to be worn (with the display image rotated by 180°) as illustrated in FIG. 9B, so that the display image can be displayed to the left eye of the user. Thus, the wearable device 100 may be freely reversed left and right to display an image to the better eye of the user. The wearable device 100 is vertically symmetrical and thus can be equally and stably held in any of the worn states.

The headband 30 is preferably capable of rotating around the first axis and the fourth axis (the axis along the left and right direction of the head 70) by 180° or more. With this configuration, the headband 30 can be freely arranged to display an image to the better eye, and to be usable with various hairstyles and the like. For example, when the headband 30 is disposed at the top of the head, the wearable device 100 may be reversed left and right with the headband 30 rotated by 180°, so that the display target is switched from one of the right and the left eyes to the other and the headband 30 is disposed on the top of the head again.

Figure 10A:
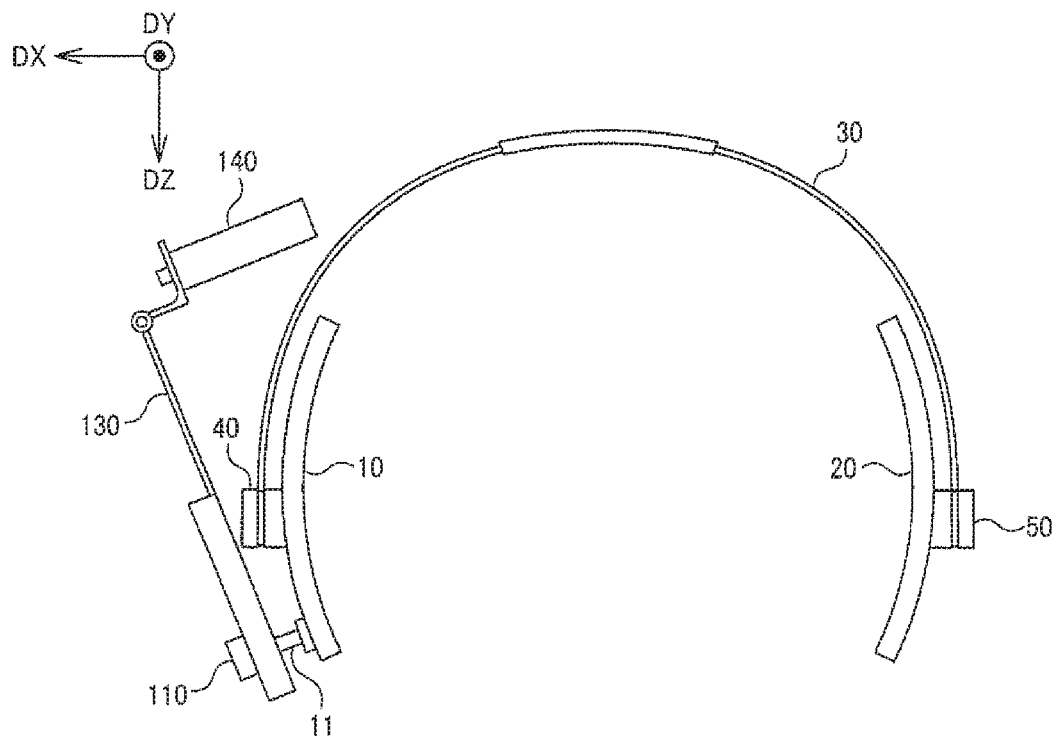
FIG. 10A and FIG. 10B are diagrams illustrating how the wearable device is folded.

In the present embodiment, as illustrated in FIG. 10A, the first contact element 10 includes the device mounting part 11 that is provided more on the forward side (DZ side) of the head 70 than the first coupling element 40, and couples the arm 130 and the first contact element 10 to each other. The arm 130 has one end holding the display 140 (the device in a broader sense). The device mounting part 11 enables the one end of the arm 130 to be rotated in directions to be on the forward side (DZ) and the backward side (−DZ) of the head 70 in the longitudinal direction of the first contact element 10.

FIG. 10A illustrates a state where the one end of the arm 130 is disposed on the backward side (−DZ) of the head 70. FIG. 4 illustrates an example where the one end of the arm 130 is disposed on the forward side (DZ) of the head 70. The device mounting part 11 and the arm 130 (coupling element 110) may be coupled to each other so as not to be detachable from each other, or may be detachably coupled to each other as described later.

When the one end of the arm 130 is rotated toward the backward side (−DZ) of the head 70, the arm 130 extends along the headband 30 as illustrated in FIG. 10A. Thus, the wearable device 100 can be in a compact form to be stored or to be carried around.

Figure 10B:
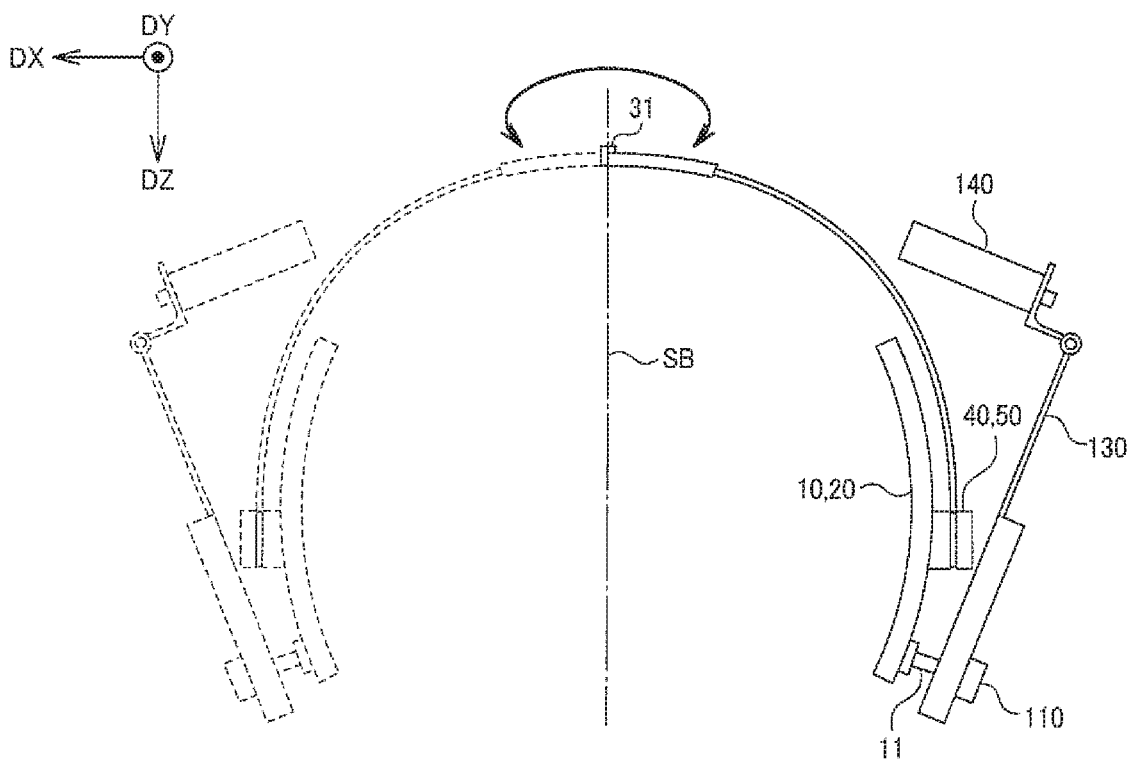

Furthermore, the headband 30 may be configured to be foldable in two as illustrated in FIG. 10B. Specifically, the headband 30 may be divided in half into left and right symmetrical segments including a first band coupled to the first contact element 10 and a second band coupled to the second contact element 20. The first and the second bands are connected to each other via a rotation mechanism 31 enabling rotation around an axis SB that is in parallel with the forward and backward direction (DZ) of the head 70 and passes through the center of the headband 30.

With this configuration, the one end of the arm 130 can be rotated toward the backward side (−DZ) of the head 70 and the headband 30 can be folded in half, so that the wearable device 100 can be in a more compact form to be stored (or carried around).

Figure 11:
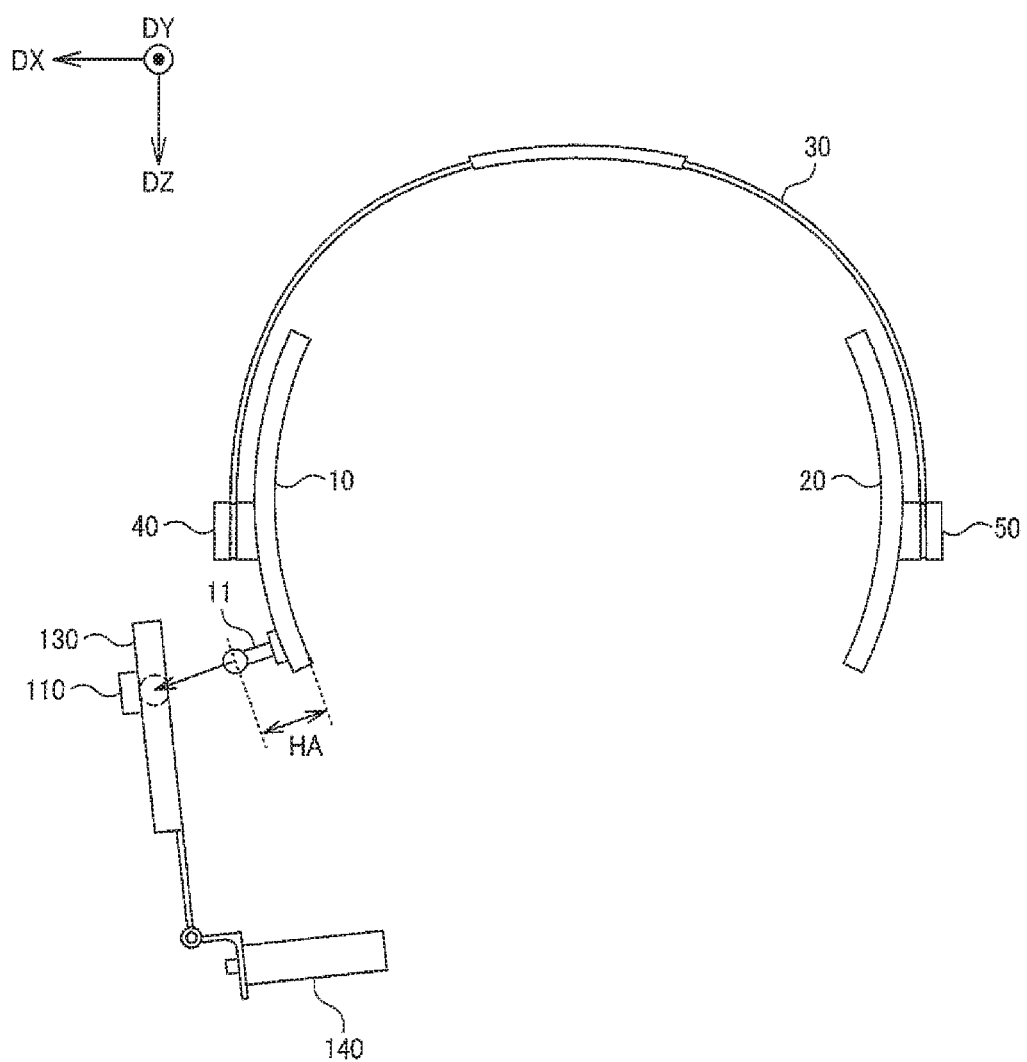
FIG. 11 illustrates a configuration example of a device mounting part.

In the present embodiment, as illustrated in FIG. 11, the first contact element 10 includes the device mounting part 11 that is provided more on the forward side (DZ side) of the head 70 than the first coupling element 40, and to which the arm 130 (and the display 140 (the device in a broader sense)) is detachably coupled. The arm 130 is rotatable relative to the first contact element 10 with the arm 130 attached to the device mounting part 11.

For example, the device mounting part 11 is a ball of a ball joint, and the coupling element 110 of the arm 130 is a ball receiver of the ball joint (a hole in which the ball fits). The ball is fitted in or removed from the ball receiver, whereby the arm 130 can be attached or detached. The ball fitted in the ball receiver can freely rotate inside the ball receiver.

With this configuration, the first contact element 10 including the device mounting part 11 enables various types of devices to be attached to and detached from the wearable device 100. For example, the user can perform an operation with the display 140 replaced by a camera as required.

In the present embodiment, as illustrated in FIG. 11, a distance HA between a position of the device mounting part 11 at which the arm 130 is attached and a surface of the first contact element 10 to be brought in contact with the temporal region is 5 mm or more and 15 mm or less.

The surface of the first contact element 10 to be brought in contact with the temporal region is a surface of the first contact element 10 to be brought in contact with the temporal region near a position where the device mounting part 11 is disposed. The distance HA represents a length of a normal line from the position of the device mounting part 11 at which the arm 130 is attached down to the surface. The position of the device mounting part 11 at which the arm 130 is attached serves as the center of rotation, for example. In other words, if the arm 130 can freely rotate relative to the device mounting part 11 (for example, a ball joint), the center of the free rotation (the center of the ball) coincides with the position of the device mounting part 11 at which the arm 130 is attached.

Figure 12:
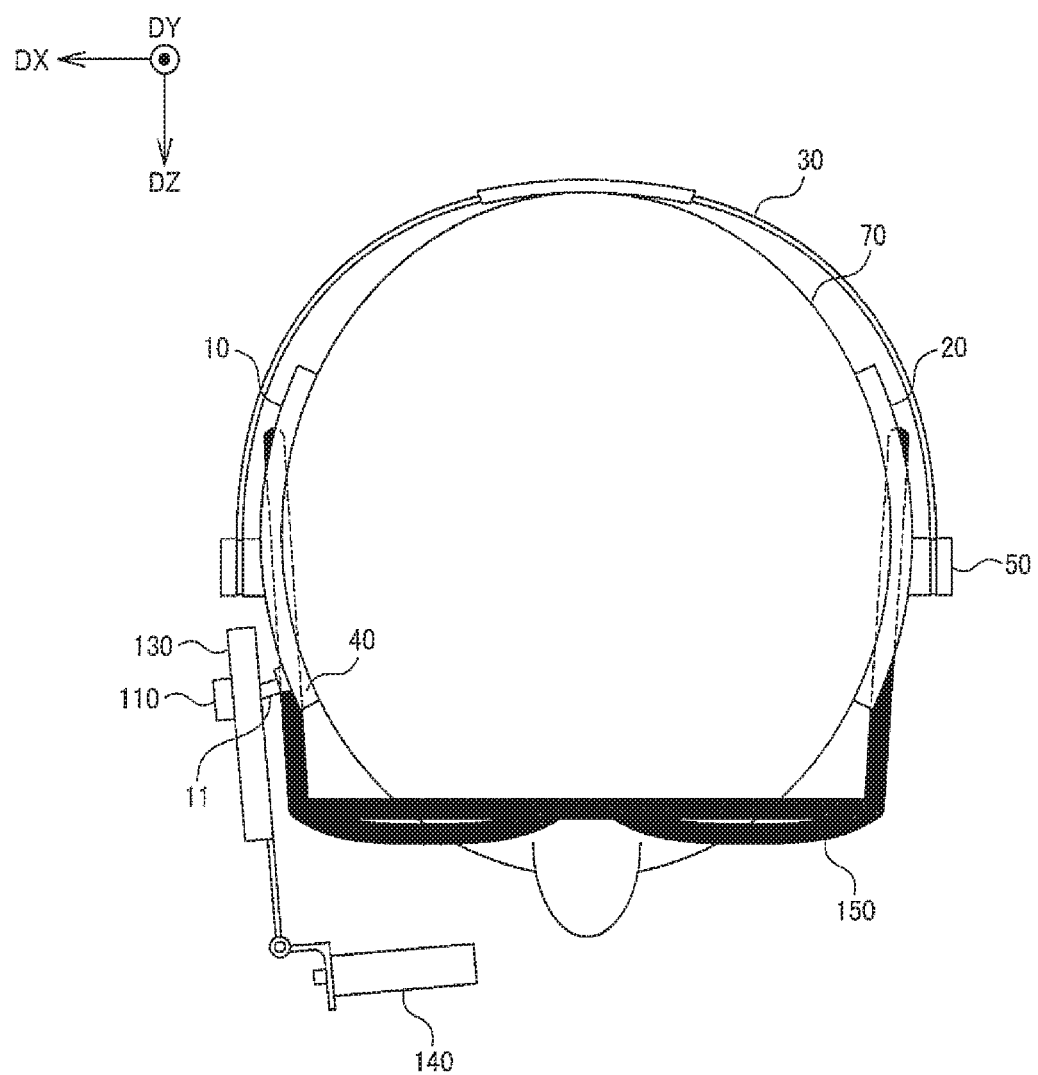
FIG. 12 is a diagram illustrating interference between the wearable device and the eyewear.

This configuration can guarantee a sufficient distance between the arm 130 and the first contact element 10 in a state where the arm 130 is attached to the device mounting part 11. As a result, the device can be attached without interfering with any worn object other than the wearable device 100. For example, as illustrated in FIG. 12, when the user wears an eyewear and the display 140 is positioned in front of the eyes of the user, the arm 130 is likely to interfere with the temple of an eyewear 150. In this regard, in the present embodiment, the arm 130 is provided to be separated from the first contact element 10, so that a sufficient distance can be secured between the arm 130 and the temple of the eyewear 150, thereby reducing a risk of interference.

The distance HA is set to be equal to or less than 15 mm because an excessively long distance HA results in the arm 130 excessively separated from the first contact element 10, results in the device mounting part 11 largely protruding from the first contact element 10. In other words, the distance HA set to be equal to or less than 15 mm can prevent the arm from becoming excessively separated from the contact element 10 to be unstable. This configuration can also provide a natural outer appearance and result in no unnecessary protrusions, lowing a risk of collision of the arm 130 with an obstacle and the like.

3. First and Second Coupling Elements

Figure 13:
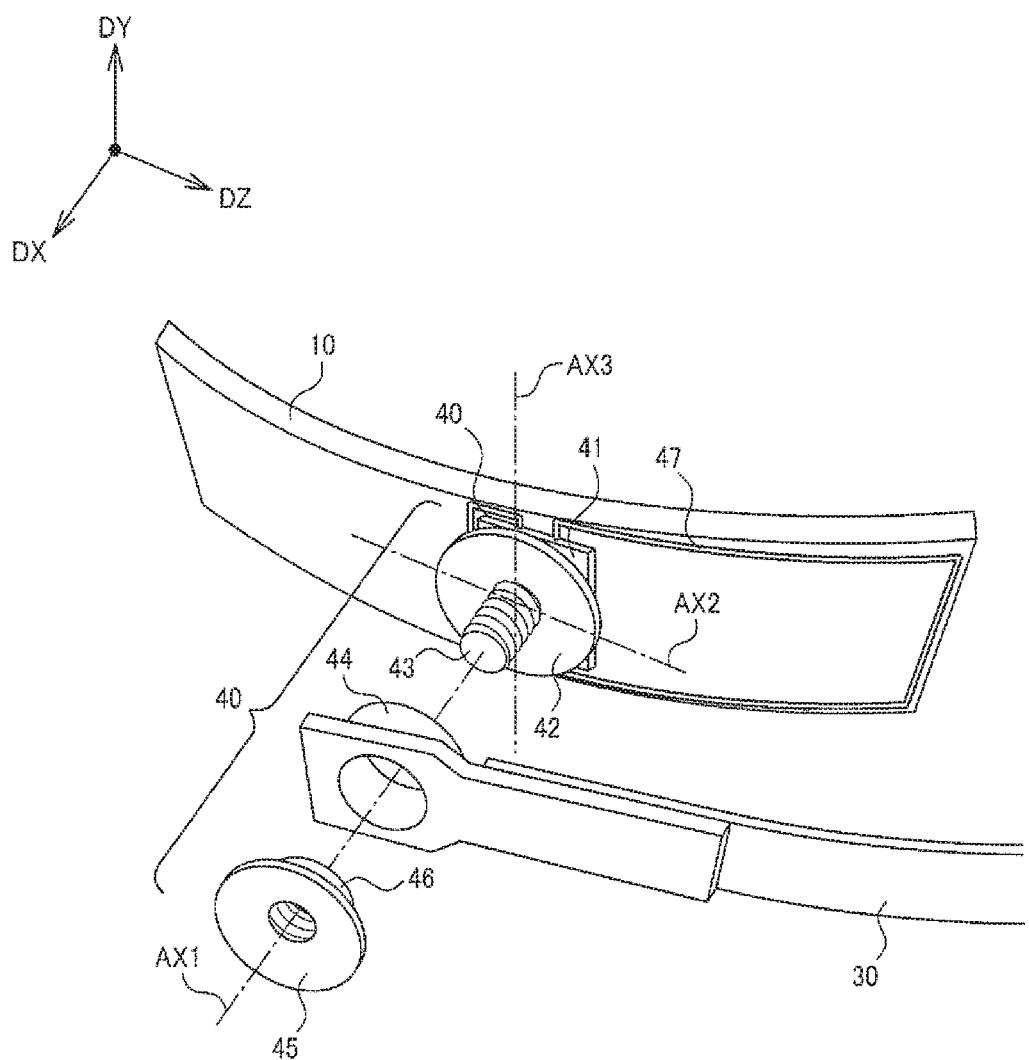
FIG. 13 illustrates a detailed configuration example of the first coupling element.
Figure 14A:
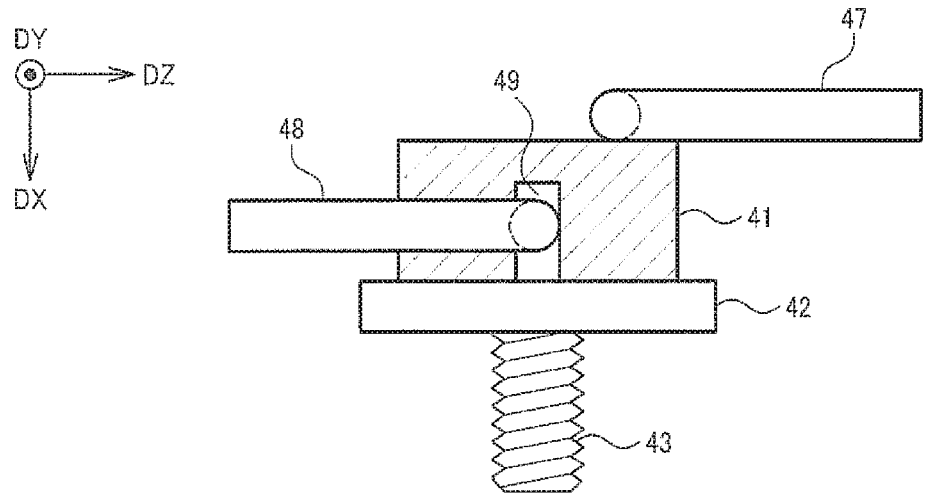
FIG. 14A, FIG. 14B, and FIG. 14C illustrate a detailed configuration example of the first coupling element.
Figure 14B:
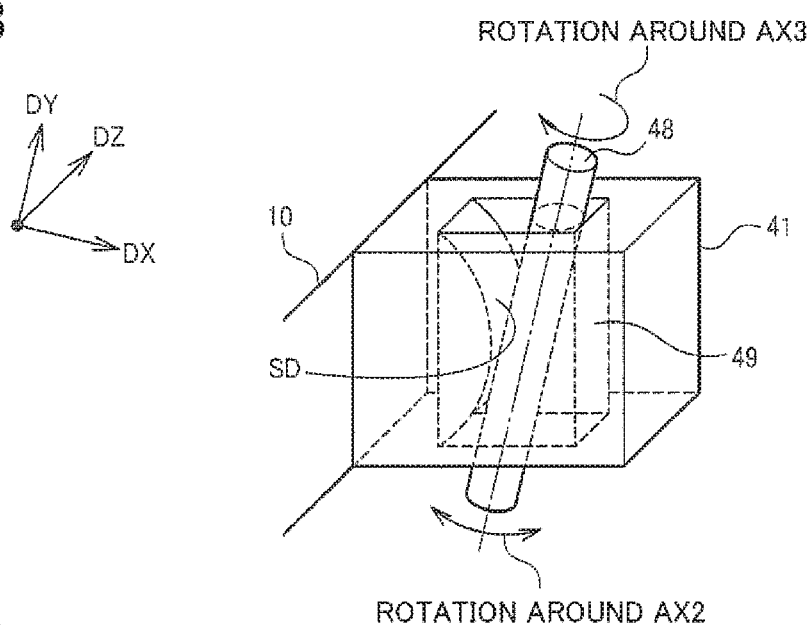
Figure 14C:
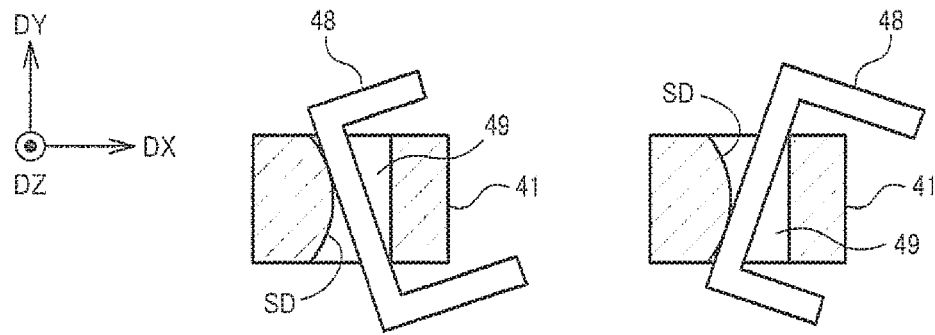

FIG. 13 to FIG. 14C illustrate a detailed configuration example of the first coupling element 40. The second coupling element 50 is configured in a similar manner.

As illustrated in FIG. 13, the first coupling element 40 includes members (parts) 41 to 48. For example, the members 41 to 46 are made of resin, and the members 47 and 48 are made of metal. The materials of these members are not limited to these.

The member 41 is a base in contact with the first contact element 10, and has a cuboidal shape. The bottom surface of the cuboid is in contact with the first contact element 10, but is not fixed to the first contact element 10.

The disc-shaped member 42 is fixed is fixed to the upper surface of the member 41 with the cuboidal shape. The member 42 is provided with the member 43 serving as a male screw. The disc of the member 42 and the male screw of the member 43 are coaxial (share the center line). The member 42 and the member 43 are integrally formed, for example.

The member 45 has a disc shape and is provided with the cylindrical member 46. The disc of the member 45 and the cylinder of the member 46 are coaxial. The center of the disc of the member 45 has a hole as large as the inner diameter of the cylinder for the member 46. The member 46 has a female screw formed on the inner curved surface of the cylinder. The member 45 and the member 46 are integrally formed, for example.

The member 44 has a cylindrical shape and is disposed at one end of the headband 30. The inner diameter of the cylinder of the member 44 is as large as or a little larger than the outer diameter of the cylinder of the member 46. The headband 30 is connected to the first coupling element 40 with the cylinder of the member 46 passing through the inside of the cylinder of the member 44 and the male screw of the member 43 engaged with the female screw of the member 46.

As illustrated in FIG. 13 and FIG. 14A, the bottom surface of the member 41 with the cuboidal shape is connected to the first contact element 10 with the member 47. The member 47 is a linear elastic member and has a shape conforming to the outer circumference of a rectangle. The shorter sides of the rectangle are along the upward-downward direction (DY) of the head 70, and the longer sides of the rectangle are curved along the curved shape of the first contact element 10. One of the shorter sides is fixed to the bottom surface of the member 41 with the cuboidal shape, and the other of the shorter sides (and part of the longer sides) is fixed to the first contact element 10.

As illustrated in FIG. 6 to FIG. 8B, the headband 30 can be held by the first coupling element 40 to be rotatable around the first axis to the third axis. FIG. 13 illustrates a first axis AX1 along the left and right direction (DX) of the head 70, a second axis AX2 along the forward and backward direction (DZ) of the head 70, and a third axis AX3 along the upward-downward direction (DY) of the head 70.

Rotation around the first axis AX1 is achieved by the members 42 to 46. Specifically, with the male screw of the member 43 engaged with the female screw of the member 46, the inner curved surface of the cylinder of the member 44 and the outer curved surface of the cylinder of the member 46 slide on each other to drive the cylinder of the member 44 to rotate, whereby the headband 30 rotates around the first axis AX1. Rotation around the second axis AX2 and third axis AX3 is achieved by the members 41 and 48, which is illustrated in FIG. 14A to FIG. 14C.

The member 48 is a linear member and has a shape conforming to the outer circumference of a rectangle. One side of the rectangle is along the upward-downward direction (DY) of the head 70, and one side is inserted in a through-hole 49 in the member 41 with the cuboidal shape. Another side facing the one side inserted in the through-hole 49 is fixed to the first contact element 10.

As illustrated in FIG. 14B, the through-hole 49 has a cuboidal shape and the opening of the through-hole 49 is rectangular with a longitudinal direction along the left and right direction (DX) of the head 70. The through-hole 49 has an inner surface, closer to the first contact element 10 (−DX side), having a curved surface SD protruding toward the inner surface (DX side) of the through-hole 49. As illustrated in FIG. 14B and FIG. 14C, the member 48, in contact with the curved surface SD, rotating along the curved surface SD results in rotation around the second axis AX2 along the forward and backward direction (DZ). The angle range of this rotation is limited by the size of the opening of the through-hole 49 (the width of the opening in the longitudinal direction).

Rotation around the third axis AX3 along the upward-downward direction (DY) is achieved by rotation of the member 41 centering on the member 48. The angle range of this rotation is limited by the force by which the member 47 presses the member 41 against the first contact element 10.

In the present embodiment, the first coupling element 40 includes a first axis rotation mechanism that enables the headband 30 to rotate around the first axis AX1, and a second axis and third axis rotation mechanism that is disposed between the first axis rotation mechanism and the first contact element 10 and enables the headband 30 to rotate around the second axis AX2 and the third axis AX3. In FIG. 13 to FIG. 14C, the first axis rotation mechanism corresponds to a rotation mechanism including the members 42 to 46, and the second axis and third axis rotation mechanism corresponds to a rotation mechanism including the members 41 and 48.

Similarly, the second coupling element 50 includes a fourth axis rotation mechanism that enables the headband 30 to rotate around the fourth axis, and a fifth axis and sixth axis rotation mechanism that is disposed between the fourth axis rotation mechanism and the second contact element 20 and enables the headband 30 to rotate around the fifth axis and the sixth axis.

When the wearable device 100 is worn on the head, the headband 30 presses the contact elements 10 and 20 against the temporal regions, and the contact elements 10 and 20 change their orientations to conform to the shapes of the temporal regions. In this process, the second axis and third axis rotation mechanism and the fifth axis and sixth axis rotation mechanism cause the contact elements 10 and 20 to change their orientations to conform to the shapes of the temporal regions, so that the contact elements 10 and 20 can be brought into contact with the temporal regions. Since the first axis rotation mechanism and the fourth axis rotation mechanism are positioned more on the outer side than the second axis and third axis rotation mechanism and the fifth axis and sixth axis rotation mechanism, the orientation of the rotation axis in the left and right direction (DX) is maintained. More specifically, rotation of the headband 30 around the rotation axis in the left and right direction (DX) illustrated in FIG. 6 will be hampered if the rotation axis is inclined; however, the direction of the rotation axis in the left and right direction (DX) can be maintained in the present embodiment. This configuration is less affected by an individual difference among users in the shape of the temporal regions, and free rotation of the headband 30 can be maintained with the direction of the rotation axis of the headband 30 maintained.

Figure 15A:
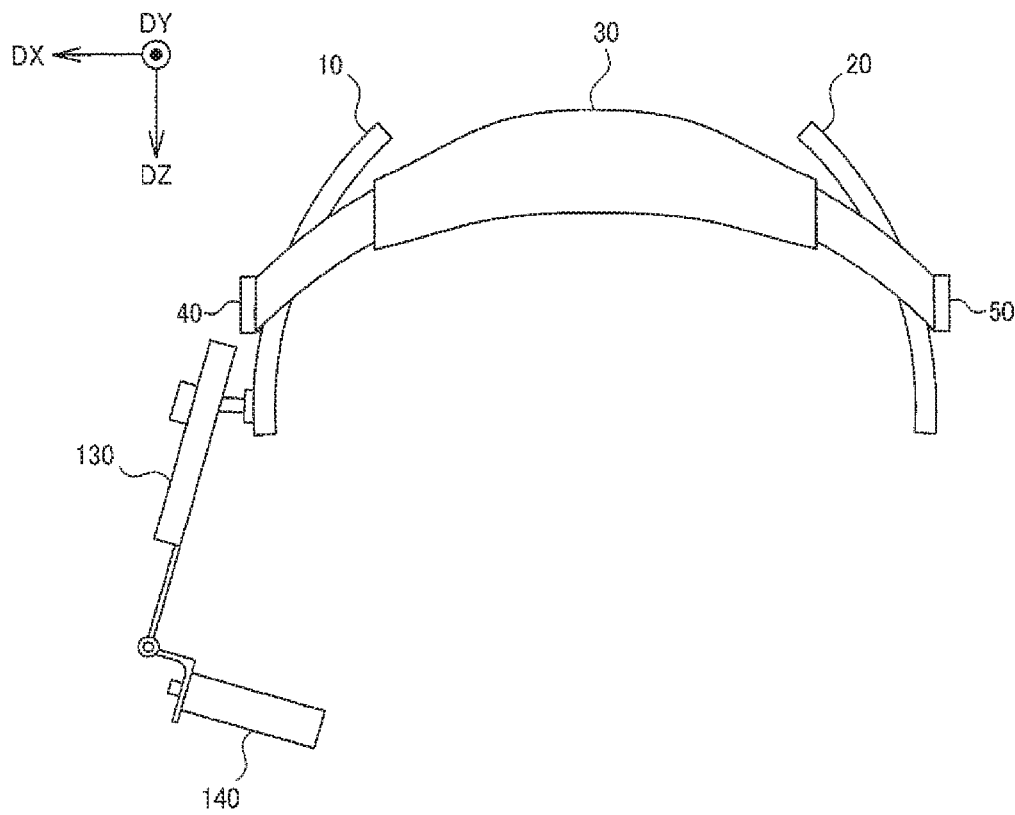
FIG. 15A and FIG. 15B are diagrams illustrating opening of a first contact element and a second contact element on the front side and the rear side, respectively.
Figure 15B:
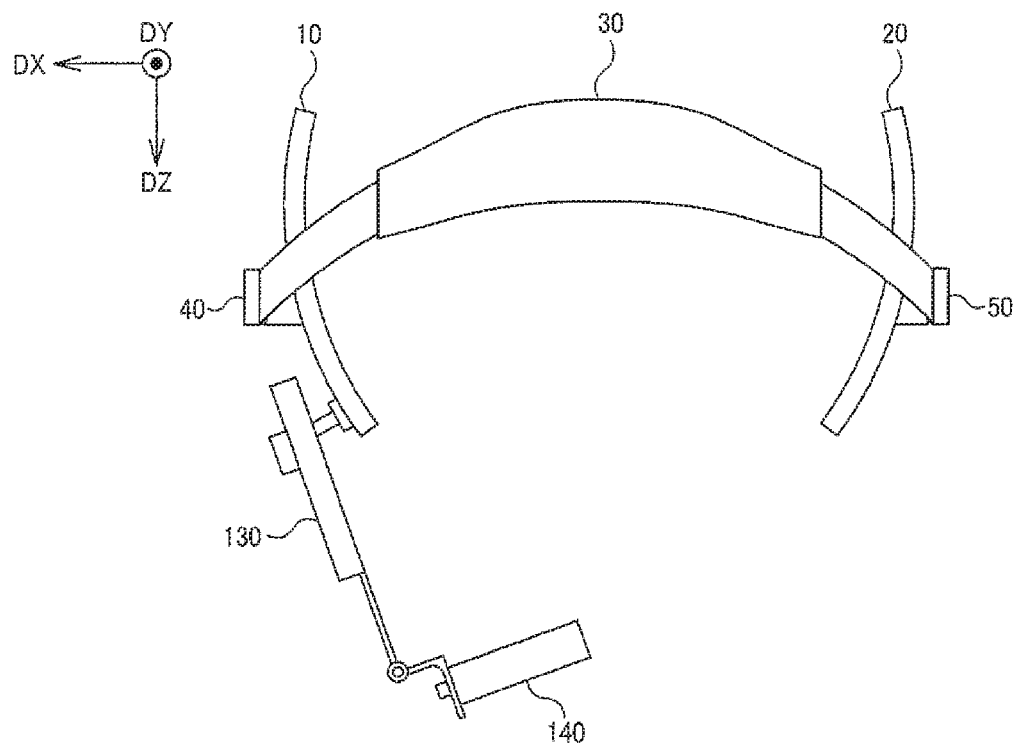

In the present embodiment, as illustrated in FIG. 15A, in the natural state where the wearable device 100 is not worn, the contact elements 10 and 20 are pressed to be opened on the front side (open more widely on the DZ side than on the −DZ side). Alternatively, as illustrated in FIG. 15B, in the natural state where the wearable device 100 is not worn, the contact elements 10 and 20 are pressed to be opened on the rear side (open more widely on the −DZ side than on the DZ side).

These types of pressing can be achieved, as described above with reference to FIG. 13 and FIG. 14A, by the shape of the member 47, pressing due to the elasticity of the member 47, and the connection state between the member 47 and the member 41. For example, when the member 47 is pressed toward the first contact element 10 such that the forward end side (DZ side) of the first contact element 10 can be pulled in the direction DX, the contact elements 10 and 20 are opened on the front side. By contrast, when the member 47 is pressed toward the first contact element 10 such that the forward end side (DZ side) of the first contact element 10 can be pulled in the direction −DX, the contact elements 10 and 20 are opened on the rear side.

When the contact elements 10 and 20 are opened on the front side, the wearable device 100 is easy to wear from the back of the head. By contrast, when the contact elements 10 and 20 are opened on the rear side, the wearable device 100 is easy to wear from the forehead side.

The embodiments to which the invention is applied and the modifications thereof have been described above. Note that the invention is not limited to the above embodiments and the modifications thereof. Various modifications and variations may be made without departing from the scope of the invention. A plurality of elements described in connection with the above embodiments and the modifications thereof may be appropriately combined to implement various configurations. For example, some elements may be omitted from the elements described in connection with the above embodiments and the modifications thereof. Some of the elements described above in connection with different embodiments or modifications thereof may be appropriately combined. Specifically, various modifications and applications are possible without materially departing from the novel teachings and advantages of the invention. Any term cited with a different term having a broader meaning or the same meaning at least once in the specification and the drawings can be replaced by the different term in any place in the specification and the drawings.

What is claimed is:

1. A wearable device comprising:
    a first contact element having a first surface that comes into contact with one of temporal regions of a wearer;
    a second contact element having a second surface that comes into contact with another of the temporal regions;
    a headband that couples the first contact element and the second contact element to each other and biases the first contact element and the second contact element toward the temporal regions in a state where the wearable device is worn on a head of the wearer;
    a first coupling that couples the first contact element and the headband to each other; and
    a second coupling that couples the second contact element and the headband to each other,
    wherein each of the first contact element and the second contact element comprise an elastic member having a longitudinal direction extending along a forward and backward direction of the head and a short-side direction extending along an upward and downward direction of the head in the state where the wearable device is worn on the head of the wearer, the elastic member being curved to conform to a curved shape of the temporal regions in the forward and backward direction, the elastic member having a greater length in the longitudinal direction than a length in the short-side direction,
    in the state where the wearable device is worn on the head of the wearer, the first coupling is a first rotation mechanism that enables the headband to rotate freely on a first axis, a second axis, and a third axis,
    in the state where the wearable device is worn on the head of the wearer, the second coupling is a second rotation mechanism that enables the headband to rotate freely on a fourth axis, a fifth axis, and a sixth axis,
    the first axis and the fourth axis are each a rotation axis extending along a direction between the first coupling and the second coupling,
    the second axis is a rotation axis extending along the longitudinal direction of the first contact element,
    the third axis is a rotation axis extending along the short-side direction of the first contact element,
    the fifth axis is a rotation axis extending along the longitudinal direction of the second contact element, and
    the sixth axis is a rotation axis extending along the short-side direction of the second contact element.

2. The wearable device according to claim 1, wherein each of the first contact element and the second contact element have the length in the longitudinal direction that is equal to or longer than 1/4 and equal to or shorter than 1/2 of a width of the head in the forward and backward direction.

3. The wearable device according to claim 1, wherein
    the first coupling is disposed more on a forward side of the head than a center of the first contact element in the longitudinal direction, and
    the second coupling is disposed more on the forward side of the head than a center of the second contact element in the longitudinal direction.

4. The wearable device according to claim 1, wherein each of the first contact element and the second contact element has the curved shape with a larger curvature than the curved shape of the temporal regions.

5. The wearable device according to claim 1, wherein the first coupling and the second coupling are disposed above ears of the wearer in the state where the wearable device is worn on the head of the wearer.

6. The wearable device according to claim 1, wherein the headband is configured to rotate around the first axis and the fourth axis within an angle range of 120° or more including an angle with which the headband is disposed above the head and an angle with which the headband is disposed on back of the head.

7. The wearable device according to claim 1, wherein
    an angle range within which the headband is rotatable around the second axis and the third axis is smaller than an angle range within which the headband is rotatable around the first axis, and an angle range within which the headband is rotatable around the fifth axis and the sixth axis is smaller than the angle range within which the headband is rotatable around the fourth axis.

8. The wearable device according to claim 1, wherein the first coupling comprises:
   a first axis rotation mechanism that enables the headband to rotate around the first axis, and
   a second axis rotation mechanism and a third axis rotation mechanism that are disposed between the first axis rotation mechanism and the first contact element and enable the headband to rotate around the second axis and the third axis, and
the second coupling comprises:
   a fourth axis rotation mechanism that enables the headband to rotate around the fourth axis, and
   a fifth axis rotation mechanism and a sixth axis rotation mechanism that are disposed between the fourth axis rotation mechanism and the second contact element and enable the headband to rotate around the fifth axis and the sixth axis.

9. The wearable device according to claim 1, wherein in a state where the headband is arranged on a side of back of the head with the headband and each of the contact elements linearly arranged along the forward and backward direction of the head as viewed in the left and right direction of the head, each of the contact elements and the headband are line symmetrical about an axis of symmetry along the forward and backward direction of the head.

10. The wearable device according to claim 1, wherein the first contact element includes a device mounting part that is provided more on a forward side of the head than the first coupling, and couples an arm and the first contact element to each other,
the arm has one end holding a device, and
the device mounting part enables the one end of the arm to be rotated in a forward direction and a backward direction of the head in the longitudinal direction of the first contact element.

11. The wearable device according to claim 1, wherein the first contact element includes a device mounting part that is provided more on a forward side of the head than the first coupling, and to which a device is detachably coupled,
the device is rotatable relative to the first contact element with the device attached to the device mounting part.

12. The wearable device according to claim 11, wherein a distance between a position of the device mounting part at which the device is attached and the surface of the first contact element to be brought in contact with the temporal region is 5 mm or more and 15 mm or less.

13. The wearable device according to claim 10, wherein the device is a display that displays an image within a part of a field of view of the wearer.

* * * * *